(12) United States Patent
Hiemenz et al.

(10) Patent No.: US 8,473,163 B2
(45) Date of Patent: Jun. 25, 2013

(54) METHOD OF DETERMINING IMPACT SEVERITY AND ADAPTIVE IMPACT ATTENUATION

(75) Inventors: Gregory Hiemenz, Silver Spring, MD (US); Wei Hu, Greenbelt, MD (US); Vaibhav Vora, College Park, MD (US)

(73) Assignee: Techno-Sciences, Inc., Calverton, MD (US)

( * ) Notice: Subject to any disclaimer, the term of this patent is extended or adjusted under 35 U.S.C. 154(b) by 390 days.

(21) Appl. No.: 12/878,465

(22) Filed: Sep. 9, 2010

(65) Prior Publication Data
US 2011/0035118 A1  Feb. 10, 2011

Related U.S. Application Data

(63) Continuation-in-part of application No. 11/670,773, filed on Feb. 2, 2007, now Pat. No. 7,822,522.

(51) Int. Cl.
*B60R 21/00* (2006.01)

(52) U.S. Cl.
USPC .............................. 701/45; 248/562; 248/566

(58) Field of Classification Search
USPC ........ 701/45, 37, 38, 49; 105/392.5; 188/266, 188/322.22; 248/562, 584, 566; 297/300.5; 293/119, 1; 180/271; 267/116, 136; 53/139.5
See application file for complete search history.

(56) References Cited

U.S. PATENT DOCUMENTS

| | | | | |
|---|---|---|---|---|
| 3,735,952 A | * | 5/1973 | Platus et al. | 248/562 |
| 3,934,912 A | * | 1/1976 | Ogihara et al. | 293/119 |
| 4,887,699 A | * | 12/1989 | Ivers et al. | 188/378 |
| 5,652,704 A | * | 7/1997 | Catanzarite | 701/49 |

* cited by examiner

*Primary Examiner* — Marthe Marc-Coleman
(74) *Attorney, Agent, or Firm* — Ober, Kaler, Grimes & Shriver; Royal W. Craig; Christopher F. Lonegro

(57) ABSTRACT

An adaptive energy absorption system for a vehicle seat is disclosed, utilizing an adaptive energy absorber or variable profile energy absorber (VPEA) for mitigating occupant injury due to extreme vehicle movement (e.g., during a vehicle shock event), and/or for mitigating vibration experienced by an occupant of the vehicle seat during normal vehicle operating conditions. The adaptive energy absorption system achieves the aforementioned objectives for a wide range of occupant weights and load levels. An alternate configuration of a dual-goal energy absorption system is also disclosed that enables both shock mitigation and vibration isolation.

41 Claims, 2 Drawing Sheets

Simplified Shock Acceleration Pulses: (a) Triangular, (b) Half-Sine, (c) Square, (d), Combination Constant Force Control System Configuration

METHOD OF DETERMINING IMPACT SEVERITY AND ADAPTIVE IMPACT ATTENUATION

CROSS-REFERENCE TO RELATED APPLICATION(S)

The present application is a continuation-in-part of U.S. application Ser. No. 11/670,773 filed Feb. 2, 2007, now U.S. Pat. No. 7,822,522.

BACKGROUND OF THE INVENTION

1. Field of the Invention

The present invention relates generally to energy absorbers and energy absorption systems, and more particularly, to adaptive energy attenuation systems for impact events, and control thereof.

2. Description of the Background

The primary function of a shock and vibration protection system is to minimize the potential for equipment damage and/or personnel injury during shock and vibration loading. Such systems are important for vehicular applications, including aircraft, ground vehicles, marine vehicles, etc. Severe shock events may include harsh vertical or crash landings of aircraft, severe water impacts of high speed watercraft, and harsh ground impacts of ground vehicles, or even horizontal crashes of ground vehicles. Moreover, lower amplitude shock and vibration tend to result from normal operation of such vehicles, including aircraft air loads or rotor loads, ground vehicles traversing rough terrain, etc. The severity of equipment damage and/or personnel injuries can be considerably minimized if the vehicles are equipped with shock and vibration protection systems. Most existing protection systems employ energy absorbers (EAs) as opposed to springs or other energy storage devices because the latter are prone to inflicting harmful force as they recoil or rebound. EA is herein defined as any suitable device used to absorb energy by providing a resistive force applied over a deformation distance without significant elastic rebound. EAs damp applied forces but do not store them to any significant degree (as do coil springs). EAs include fixed profile energy absorbers (FPEAs) which have a constant load-stroke curve, such as standard hydraulic or pneumatic cylinders. However, FPEAs are passive, meaning that they cannot automatically adapt their energy absorption as a function of payload weight or as a function of real-time environmental measurements such as shock level, impact velocity, vibration levels, etc. Moreover, some FPEAs are essentially very stiff and therefore do not stroke until the load reaches a tuned threshold. Because of this, these systems provide little to no isolation of vibration. This motivates the use of a shock and vibration protection system that utilizes an electronically adjustable adaptive energy absorber, or "variable profile energy absorber" (VPEA) that can provide adaptive energy absorption for enhanced crashworthiness as well as vibration mitigation. VPEAs impart a controlled resistive force that can be continuously adjusted over a known deformation distance of the VPEA. Since the resistive force can be continuously adjusted over the deformation distance, the VPEA can be controlled in real time to respond to changing environmental stimuli including load levels to effectively mitigate loads into the occupant's body. Suitable VPEAs may comprise any of an active valve damper, a magnetorheological fluid damper (including rotary magnetorheological fluid brake or clutch), an electrorheological fluid damper, a magnetic energy absorber, a servo-hydraulic actuator (with an orifice adjusted by electromechanical actuator), or an electronically adjustable friction device such as a piezo-electric friction damper or magnetically controlled friction damper. Active valve dampers are pneumatic or hydraulic cylinders that rely on internal valving changes to automatically adjust their damping effect. Active valve dampers with electrically controlled damping constants are known in the art, and typically use variable valve orifices to adjust the damping force.

Magnetorheological (MR) technology is particularly attractive for shock and vibration protection systems because an MR fluid based device is capable of achieving what is effectively a continuously adjustable energy absorber. An MR fluid based device in combination with a real-time feedback controller can automatically adapt to payload weight and respond to changing excitation levels. With its ability to smoothly adjust its load-stroke profile, MR energy absorbers can provide the optimum combination of short stroking distance and minimum loading while automatically adjusting for the payload weight and load level. Furthermore, MR energy absorbers offer the unique ability to use the same system for vibration isolation.

One key challenge in controlling an electronically adjustable energy absorption system is determining how to adapt the force levels to effectively minimize the loads transmitted to the payload for each individual impact. If an adaptive energy absorption system only reacts to a measured impact pulse, the system may exhaust a considerable amount of its limited stroke capability before it is able to make any force adjustments. This wasted stroke will either necessitate additional stroking capability (which in turn requires larger energy absorbers and so may not be geometrically possible for a given application), or else risk the system reaching end-stop impact (which could be harmful to the payload). Moreover, many adaptive suspension systems include a spring as a restorative element to prepare for subsequent impacts. Springs impart a return force that is proportional to stroking distance. Consequently, utilizing more stroke than necessary in a spring-return adaptive suspension system is not ideal because it can result in more force being transmitted to the payload.

The kinetic energy of a suspended payload prior to impact is given by equation [1]:

$$E_K = \frac{1}{2} M V_p^2 \quad [1]$$

where M is the payload mass and $V_p$ is the absolute velocity of the payload just prior to impact. Upon impact, this energy will be converted to energy absorbed and/or stored by the impact surface (ground, floor, wall, etc.), energy absorbed (damping) and/or stored (stiffness) by any payload substructure (beneath the payload and energy absorption system), and energy absorbed and/or stored by the adaptive energy absorption system. Depending upon how "soft" or "stiff" the impact surface and payload substructure is, the resulting impact acceleration pulse will be correspondingly low or high in magnitude and duration. That is, an impact on a stiff surface with stiff or no payload substructure will result in a higher magnitude and short duration acceleration pulse than one on a soft surface with flexible or crushable substructure with the same initial kinetic energy. Fortunately, the energy absorption and energy storage properties of the impact surface and payload substructure are often common across particular applications, and so a particular application itself establishes certain parameters useful for characterizing impact events.

It would be greatly advantageous to provide an adaptive energy absorption system that determines the severity of a particular impact event a priori. The invention disclosed herein provides a means to determine such impact severity as well as strategies for controlling an energy absorption system in accordance therewith.

SUMMARY OF THE INVENTION

It is an object of the present invention to prevent vehicle occupant injury and/or protect critical electronic/devices during shock events.

It is another object of the present invention to minimize the shock induced load experienced by the occupant/payload by utilizing the full or desired stroke of the energy absorption system.

It is another object of the present invention to provide a control signal to an energy absorber in conjunction with an energy absorption system to cause the absorber to apply the necessary oppositional force.

Accordingly, there is provided a novel system and process for determining the severity of an impact and for controlling an adaptive energy absorption system thereto. The method utilizes an a priori estimate of impact acceleration pulse characteristics (magnitude, duration, shape, etc.) and payload information (mass) in combination with measured dynamic motion information. Given the a priori estimate of impact acceleration pulse characteristics and measured dynamic motion information, the present invention determines peak amplitude and duration of the anticipated shock event, and uses this to determine the required constant oppositional control force to apply to efficiently mitigate the shock impulse to the payload. Sensor(s) monitor in real time the vehicle and/or payload velocity in anticipation of a shock event. A controller automatically detects a shock event and, based on the a priori information, estimates the entire shock impulse curve and duration. The controller then calculates a desired oppositional force and adjusts an energy absorber to apply the appropriate amount of force in real-time throughout the shock event to more efficiently mitigate shock and avoid damage to a payload and/or injury to an occupant.

BRIEF DESCRIPTION OF THE DRAWINGS

FIG. 3 is a block diagram illustrating the method of the present invention during a real-time shock event using one velocity sensor 70a.

DETAILED DESCRIPTION OF THE INVENTION

The control system according to the present invention will be herein shown in the context of a shock energy absorption system for a vehicle seat, although the invention is applicable to any payload shock energy minimization application. In the vehicle seat context, the control system includes a plurality of vehicle-mounted components, generally including a controller (processor with memory), one or more sensors (displacement, velocity, or accelerometer) connected to the processor for monitoring impact velocity in real time, and a VPEA operatively connected between the vehicle seat and vehicle frame.

Figure 1:
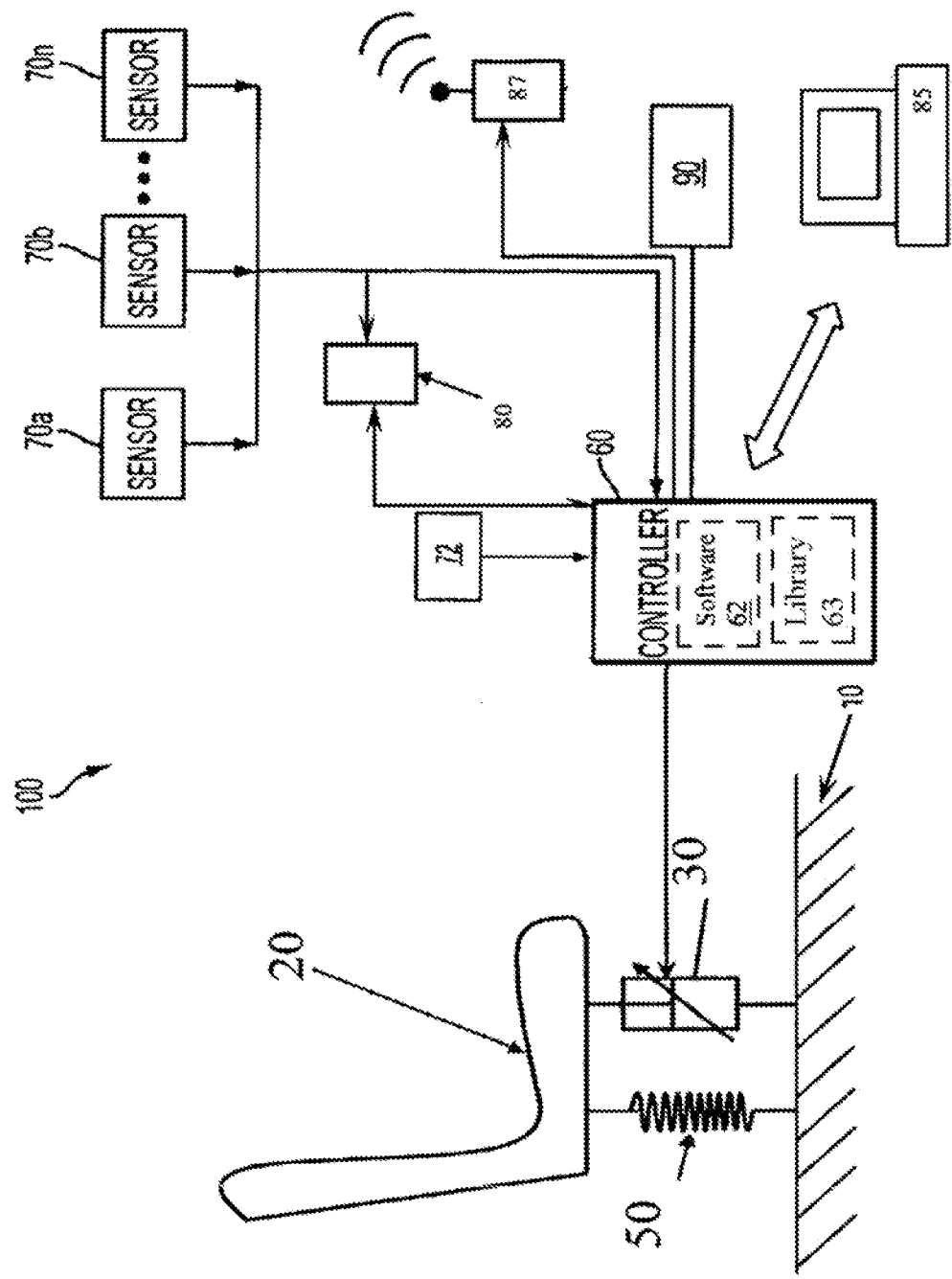
FIG. 1 is an exemplary illustration of a suitable adaptive energy absorption system 100 for a vehicle seat, according to an embodiment of the invention.

FIG. 1 is an exemplary illustration of a suitable adaptive energy absorption system 100 for a vehicle seat, according to an embodiment of the invention. The seat 20 may be any type of vehicle seat including, but not limited to, aircraft (e.g., rotorcraft, fixed wing, etc.) seats, land vehicle seats (e.g., seats for heavy-duty military, agricultural, and construction vehicles, etc.), marine vehicle seats, or seats for other vehicles that may experience shock loads. A VPEA 30 is operatively connected to vehicle seat 20, and to a base 10 which may be any supporting structure of the vehicle (such as the vehicle frame or extension thereof). In a preferred embodiment, a stiffness element 50 such as a coil spring is operatively connected, preferably in parallel, between the vehicle seat 20 and the supporting structure of the vehicle for vibration isolation and recoil-return of the VPEA 30. A programmable controller 60 is in communication with VPEA 30. Controller 60 includes memory for storing and running control software 62 that automatically adjusts VPEA 30 in real-time to an optimal setting based on feedback from one or more sensors (70a, 70b, ... 70n) and an optional payload weight indication mechanism 72. Controller 60 processes the sensor data in accordance with a library of predetermined shock acceleration profiles 63 also stored in controller memory 60 as will be described. One skilled in the art should understand that a single controller 60 may be used to control multiple VPEA 30-equipped seats 20 as depicted in FIG. 1. Controller 60 may comprise a processor, as well as a memory for storing control software 62 for execution by the processor, plus the library of predetermined shock acceleration profiles 63. Based on processing performed, controller 60 interfaces with, and generates one or more control signals (controller outputs) to control VPEA 30. VPEA 30 may comprise any suitable adaptive energy absorber that can adjust its load profile as commanded by controller 60 in real time, as vehicle seat 20 strokes, for example, during a crash or other vehicle shock event. MR and ER energy absorbers, in particular, are advantageous because they are able to achieve what is effectively an infinitely adjustable profile energy absorber. MR fluid dampers, in particular, are advantageous in that they are easily powered by a DC electrical supply (e.g., battery) which facilitates the provision of an independent power source (e.g., power source 90), as described above. Suitable MR damper designs may be found in U.S. Pat. No. 6,694,856 B1 (issued Feb. 24, 2004), entitled "MAGNETORHEOLOGICAL DAMPER AND ENERGY DISSIPATION METHOD" to Chen et al., which is hereby incorporated by reference herein in its entirety.

At a minimum, at least one sensor 70a is provided for deriving an impact velocity measurement. The impact velocity may be measured by the adaptive energy absorption system 100 in a number of different ways. For ground vehicles moving horizontally (transverse to gravity) such a measurement may be made by the existing vehicle's speedometer or a tachometer. Alternatively for aircraft, the aircraft's airspeed indicator and/or altimeter may be leveraged by the adaptive energy absorption system 100. In the presently-preferred embodiment of the system 100, sensor 70a comprises an accelerometer and impact velocity is derived from the accelerometer measurements. Specifically, an accelerometer sensor 70a may be mounted to the payload, for example, attached to the vehicle seat 20 to provide real-time acceleration monitoring to the controller 60. When the controller 60 detects a free-fall event, the controller 60 software 62 can begin integrating acceleration with respect to time to calculate the vertical impact velocity. Alternately, sensor 70a may be a displacement sensor rather than an accelerometer. When a suspension system with a spring 50 and displacement sensor 70a is statically loaded and not in free-fall, the spring 50 compresses due to the weight of the payload (1G times the payload mass) and the displacement sensor 70a will measure a value corresponding to this static compression. During free fall, the spring 50 will unload and the displacement sensor will measure a value corresponding to lesser compression. The controller 60 software 62 can derive the real-time impact velocity simply multiplying a constant free-fall acceleration value by the amount of time that the spring displacement sensor 70a is unloaded. Further, for a case where the payload is not in a true free fall (that is, accelerating at a lower value than 1 G) the constant free-fall acceleration value can be scaled by a ratio of the amount of lesser compression measured by the displacement sensor 70a to the amount of lesser compression expected during true free fall.

Thus, one skilled in the art should understand that sensor 70a may be any sensor from which impact velocity may be derived. To do this sensor 70a may measure force (e.g, a load cell), acceleration (e.g., an accelerometer), velocity (e.g., PVT, etc.), strain/displacement (e.g., LVDT, strain gauge, etc). Moreover, sensor 70a may comprise an existing vehicle sensor (for example, an aircraft altimeter to measure sink rate, or a vehicle speedometer or tachometer). Sensor 70a may be mounted on or proximate the payload on vehicle seat 20, or on the base 10 of the vehicle (e.g., on the floor of the vehicle, or on a platform or other structure to which vehicle seat 20 may operatively connected). In addition, a plurality of sensors 70a . . . n may be distributed throughout the vehicle.

In a preferred embodiment for a stand-alone system undergoing vertical impacts, an accelerometer or plurality of accelerometers may be mounted to the payload. When the accelerometers sense a free-fall event, the controller would begin integrating acceleration with respect to time to calculate the vertical velocity. Therefore, if the payload were accelerating towards the impact surface at a constant 1G, the calculated vertical impact velocity would thus increase linearly until the time of impact. The controller would then know the impact velocity at each moment in time prior to impact and be able to adjust the adaptive energy absorption system accordingly prior to impact. If the impacts for a particular application were known to always follow a constant 1G free-fall (or other constant acceleration free-fall due to friction, drag, etc.) the real-time impact velocity could be simply determined by multiplying this constant acceleration by the time duration of the free-fall.

In another embodiment, the sensor 70a may be a displacement sensor rather than an accelerometer. When a suspension system with a spring 50 is statically loaded and not in free-fall, the spring 50 will compress due to the weight of the payload (1G times the payload mass) and the displacement sensor 70a will measure a value corresponding to this static compression. During free fall, the spring 50 will unload and the displacement sensor 70a will measure a value corresponding to lesser compression. The real-time impact velocity can then be determined by simply multiplying a constant free-fall acceleration value by the time that the suspension is unloaded. Further, for a case where the payload is not in a true free fall (that is, accelerating at a lower value than 1G) the constant free-fall acceleration value can be scaled by a ratio of the amount of lesser compression measured by the displacement sensor 70a to the amount of lesser compression expected during true free fall.

Controller 60 also needs to be able to obtain the payload mass/weight and this can be predetermined and manually entered (programmed into memory 62 or manually set by a passenger control dial), or it can be sensed by dedicated weight sensor 72. In a preferred embodiment, the weight sensor 72 is a conventional strain gauge, load cell (force transducer) and/or displacement sensor (in combination with a known spring stiffness to measure static displacement of a spring), or other like mechanism used to obtain a payload or occupant's weight (or mass). Such a mass/weight measurement may be taken and stored by the controller upon system startup, may be taken periodically throughout system operation to update the stored value. Alternatively, the system 100 may continually measure the payload mass/weight in real-time to provide continually updated values. This is particularly desirable in seated occupant protection systems whereas occupants may change seats or increase/decrease the amount of body-worn equipment. For this real-time payload weight/mass measurement, it may be desirable to utilize a low-pass filter (either externally or internal to controller 60) to filter out undesirable oscillations and/or measurement errors due to noise, vibration and/or other dynamic loading.

The components of system 100 may be powered by a power source 90. The power source 90 may comprise an existing power source associated with the vehicle. Alternatively, power source 90 may comprise a source (e.g., one or more batteries) independent of the vehicle so as to enable system 100 to continue to function in the event of a loss of vehicle power due to, for example, a shock event, or for any other reason. System 100 may be powered by a power source associated with the vehicle, while power source 90 serves as a "back-up," independent power source which will activate upon a loss of vehicle power.

Stiffness element 50 may operate passively, semi-actively, or actively, and may have a fixed or variable stiffness profile. For example, the stiffness element 50 may be a coil spring operating as a passive element. Alternately, stiffness element 50 may have a variable stiffness profile and function as a semi-active, or active element. Examples of stiffness element 50 may include, but are not limited to, coil springs, leaf springs, visco-elastic material, or hydraulic or pneumatic dampers. Stiffness element 50, if used, may be implemented such that it provides a tuned stiffness for vibration control (preferably soft to reduce transmissibility). The tuning of this stiffness is important because its use may sacrifice some stroke of the VPEA 30 during a shock event. Use of a variable stiffness spring (vs. fixed stiffness) may be advantageous because it would enable tuning to varying occupant masses. The stiffness element 50 may be variable, adjusted by a manual control mechanism (e.g., a dial), or automatically adjusted based upon an occupant mass measurement. In addition, according to the present invention, the stiffness element 50 performs a recoil and recovery function to return the VPEA 30 to substantially its initial position after a first shock event quickly enough to perform its function for a subsequent shock event.

If desired, a data logger 80 may be provided to store and record information related to the shock and/or vibration such as measurements thereof. The data logger 80 may be connected directly to the sensors 70a-70n to log the sensor data in internal memory for later download to a computer. There are a variety of conventional data loggers that will suffice for this purpose, including DATAQ™ Instruments line of Data Logger products for Stand-alone and PC connected Applications. The data logger may also be embedded into the controller 60 itself, whereas the controller's microprocessor stores the sensor data or processed sensor data (i.e., filtered, mathematical operations, etc.) onto onboard memory, such as internal microprocessor memory, an on board hard drive, or other onboard memory (i.e, removable or non-removable solid state memory, removable media, etc). The data logger 80 and/or removable memory/media may also be connected to the controller 60 and/or in communication with a remote host computer 85 for analysis, evaluation, and/or storage of the data. For example, the data may be analyzed to provide a vehicle and/or personnel dosimetry capability, in which logged shock and/or vibration data is used to keep record of vehicle and/or vehicle occupant exposure for health/maintenance purposes. The controller 60 may be programmed to compare sensor data to predetermined thresholds to determine shock events and/or vibration exposure exceeding defined limits.

In accordance with the method of the present invention, an a priori impact velocity measurement and acceleration pulse characteristic (shape and magnitude and duration) are fully characterized just before the shock event actually occurs. As described above this is possible since the energy absorption and energy storage properties of the impact surface and payload substructure are often common across particular applications (e.g., particular helicopters share common substructures and experience vertical impacts onto ground). Consequently, the impact acceleration pulse (shape, magnitude, duration, etc.) can be estimated a priori for each application. Moreover, the area under the curve of the acceleration pulse is equal to the impact velocity. As such, with an a priori impact velocity measurement and acceleration pulse characteristic (shape, magnitude, duration), the impact event can be fully characterized just before it occurs.

Thus, for example, a helicopter crash event onto firm ground with crushable payload substructure will tend to cause a triangular pulse as shown in FIG. 2a that tends to be about 50 milliseconds in duration. In accordance with the method of the present invention we assume this pulse characteristic a priori and continuously update our impact velocity measurement during the helicopter's descent. A free-fall onto water for marine vehicles (resulting in displacement of a certain amount of water based on the weight and shape of the vehicle) can be characterized by a half-sinusoid impact acceleration curve as seen in FIG. 2(b) before it occurs.

Figure 2:
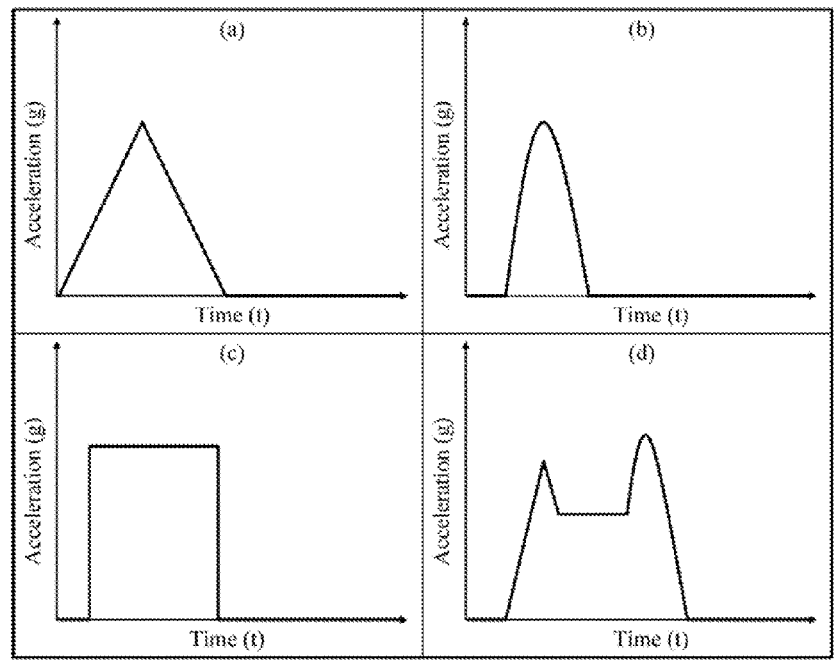
FIG. 2 illustrates a variety of exemplary shock acceleration profiles in graphical form.

In order to do this, the controller 60 references at least one predetermined shock acceleration profile 63 (such as FIG. 2a). In order to implement the foregoing, at least one predetermined shock acceleration profile 63 is stored in mathematical form (as an equation) in controller memory 62, and even more preferably a library of predetermined shock acceleration profiles 63 representing different situations and circumstances are so stored. FIG. 2 illustrates a variety of exemplary shock acceleration profiles in graphical form. Each profile (a-d) represents simplified shock acceleration over time for a typical shock event caused, for example, by front impact, drop, bump, etc. Each shock acceleration profile is at least characterized by the general shape of the shock pulse (half sine, triangular as at (a), bell-shaped as at (b), stepped as at (c), trapezoidal, compound as at (d), etc), in a simplified (smoothed) format omitting transient pulses as would be measured by an accelerometer during a real time shock event. More preferably, each shock acceleration profile is characterized by the general shape of the shock pulse, plus one or both of magnitude (peak acceleration) and/or duration of the assumed a priori pulse characteristic, the latter typically being supplied for variables in the mathematical equation representative of the predetermined shock acceleration profile 63 in controller memory 62. For some applications, the duration of the actual shock pulse is predictable (from impact velocity or shape) and an a priori value can be predetermined, though the magnitude is unknown. For some applications, the magnitude of the actual shock pulse is predictable (from impact velocity, duration or shape) and an a priori value can be determined, though the duration is unknown. In other applications, both the magnitude and duration of the actual shock pulse is predictable (from impact velocity, duration or shape). In still other applications, neither the magnitude or impact velocity of the actual shock pulse can be predicted, and only the shape of the shock acceleration profile 63 can be determined. In this latter case, which is indeed the case for marine seat applications, both magnitude and duration can vary, albeit within a range that can be predetermined based on a measured impact velocity. Consequently, given a priori estimated shape and measured impact velocity, it may be necessary for the controller 60 to predict the range and select a somewhat arbitrary magnitude and/or duration within the predicted range, such as a midpoint therein. This is not as accurate or preferred as having a fixed a priori value for magnitude or duration, but still works fairly well in practice. Thus, each shock acceleration profile 63 equation stored in controller memory 62 characterizes at least the a priori shape, and is further characterized by a predetermined magnitude or duration of the anticipated shock pulse as depicted graphically in FIG. 2 (the predetermined magnitude or duration being a fixed deductive value or educated assessment.

Thus, in operation, if controller 60 is programmed for mitigating a helicopter freefall, it will select or be pre-programmed to reference the equation representing the shock acceleration profile 63 shown in FIG. 2a. During the free fall, the controller 60 monitors and maintains an updated impact velocity measurement from sensor 70a (and optionally payload mass from sensor 72) would adjust the electronically adjustable VPEA 30 in real-time to account for the updating impact velocity measurement and payload mass. The VPEA 30 would then be ready and set to the appropriate value for the impending impact. Upon impact the force levels would be adjusted appropriately to minimize the load transmitted to the payload. In a preferred embodiment, the force levels of $F_{EA}$ of the VPEA 30 would be adjusted in time, t, based upon a known or measured payload mass/weight, M, and a measured absolute velocity of the payload, $V_s$, per the below equation [2]:

$$F_{EA}(t) = \propto M V_s(t)^n \quad [2]$$

where, $\propto$ and n is a scale factor and exponent, respectively, that can be adjusted based upon the impact acceleration pulse characteristic of FIG. 2 that is expected for the application.

Figure 3:
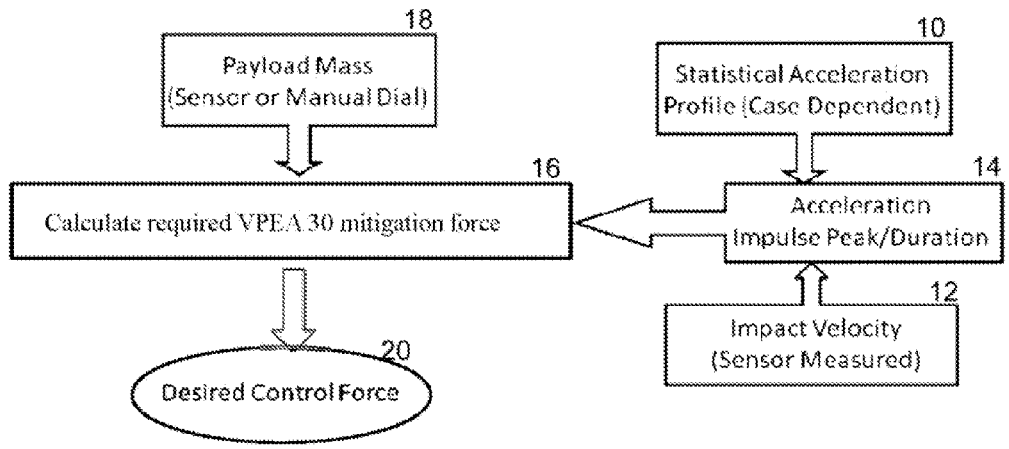

FIG. 3 is a block diagram illustrating the method of the present invention during a real-time shock event using one velocity sensor 70a. At step 12, prior to impact, the sensor 70a monitors velocity and communicates this to the controller 60. At step 10, likewise before impact, the controller 60 selects or is preset for one of the shock acceleration profiles (of FIG. 2). This selection may be made beforehand based entirely on pre-existing characteristics (the type of application, marine, helicopter, etc.) or can be based in part on the measured pre-impact velocity or external system such as vehicle system, etc. At step 14 the controller 60 analyzes the sensor-measured impact velocity in conjunction with the selected shock acceleration profile (including anticipated event duration) to determine an a priori impact velocity measurement and acceleration pulse characteristic (shape and magnitude or duration) just before the shock event actually occurs. Given the a priori impact velocity measurement and acceleration pulse characteristic (shape and magnitude or duration), the impact event can be fully characterized just before it occurs. Again, an airborne crash event onto firm ground with crushable payload substructure will tend to cause the triangular pulse of FIG. 2a. Therefore, if the payload were accelerating towards the impact surface at a constant 1G, the calculated vertical impact velocity would thus increase linearly until the time of impact. The controller 60 would then know the impact velocity at each moment in time prior to impact and be able to adjust the VPEA 30 accordingly prior to impact. If the impacts for a particular application were known to always follow a constant 1G free-fall (or other constant acceleration free-fall due to friction, drag, etc.) the real-time impact velocity could be simply determined by multiplying this constant acceleration by the time duration of the free-fall. A free-fall onto water (resulting in displacement of a certain amount of water based on the weight and shape of the vehicle) can be characterized by a half-sinusoid impact acceleration curve of FIG. 2b before it occurs. Thus, given the appropriate pulse characteristics, in conjunction with real-time monitoring of impact velocity, the acceleration magnitude and/or duration of the impact pulse can be accurately predicted or at least estimated.

At step 16 controller 60 calculates the desired counteractive force levels of $F_{EA}$ of the VPEA 30, and at step 20 adjusts VPEA 30 in time, t, based upon a known or measured payload mass/weight, M, derived at step 18, plus the measured absolute velocity $V_s$ of the payload derived at step 12, per the above equation [2]. The VPEA 30 (connected between the vehicle seat and vehicle frame) then mitigates the impact shock force over its known or available stroke length. Thus, the adaptive energy absorption system 100 of FIG. 1 can be preprogrammed for the impact pulse characteristics of a particular application and the key required information needed for the system 100 to operate are the impact velocity and payload mass. The foregoing approach is implemented by controller software 62 which can be summarized by the following sequence:

1. Determine system parameters
   a. Predetermine, sense or input payload information (mass) by, e.g. strain gauge or sensing static displacement in the spring element;
   b. Monitor vehicle velocity e.g. by sensor(s) 70a . . . n (accelerometers, PVTs, aircraft instrumentation, etc.);
   c. Payload mass and vehicle velocity transmitted to processor 60;
2. Determine impulse characteristics
   a. Shape and duration are prescribed based on different applications, appropriate predetermined shock acceleration profile 63 is selected by controller 60 (may be selected from controller memory 62 and/or chosen from a library of different shock acceleration profiles);
   b. Peak impulse g level determined by controller 60 based on measured impact velocity, payload mass, predetermined (known) shape and predetermined (known or estimated) duration of impulse.
3. Calculate by controller 60 required oppositional force to be applied to VPEA 30;
4. Controller 60 signals VPEA 30 to apply and maintain calculated constant force to minimize shock force to payload.

If desired, the controller 60 and software 62 may be programmed to operate in two distinct modes, one for normal vibration control and one for extreme motion shock events. The addition of vibration control enhances comfort and reduces fatigue for the occupant of the vehicle seat 20. During an extreme motion event (e.g., a shock event), readings from sensor 70a may trigger the controller 60 into a secondary shock mode. In both modes the controller 60 may monitor sensor 70a to determine velocity. In such as case where sensor 70a is an accelerometer, noise and/or bias/offsets in the sensor signal may cause considerable drift or inaccuracies in the calculation of velocity. In such a system, a resettable integrator may be preferred. The controller 60 software 62 integrates acceleration with respect to time to calculate the vertical impact velocity, and periodic resetting of the integration will remove drift associated with noise/bias in the accelerometer signal. This is necessary in cases where the integration must be performed continuously. The act of resetting the integrator, however, will impede the calculation of impact velocity in mode 2. To prevent this, the controller software 62 may be programmed to interrupt the periodic resetting of the integration when the system is in free-fall and until the impact event is over. The onset and duration of the free-fall for which the integration reset is suspended may be determined from the sensor 70a readings as described below. If desired, additional logical thresholds can be implemented in the control software 62 such as velocity, stroke, and or acceleration thresholds which may further suspend integrator reset until after the shock event (mode 2) is complete.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims and may be used with a variety of materials and components. This application is therefore intended to cover any variations, uses, or adaptations of the invention using its general principles. Further, this application is intended to cover such departures from the present disclosure as come within known or customary practice in the art to which this invention pertains.

We claim:

1. An adaptive energy absorption system comprising:
   a variable profile energy absorber connected between a payload and a supporting structure;
   one or more sensors for determining impact velocity of said payload;
   a controller comprising memory storing predetermined acceleration pulse profile characteristics including at least shape of an anticipated shock pulse associated with shock events for a particular application, and for storing software by which said controller electronically adjusts a force level of said variable profile energy absorber based upon determined impact velocity, a known payload mass, and said predetermined acceleration pulse profile characteristics.

2. An adaptive energy absorption system of claim 1, wherein the predetermined acceleration pulse profile characteristics include shape and duration of an anticipated shock pulse associated with shock events for a particular application.

3. An adaptive energy absorption system of claim 2, wherein the predetermined acceleration pulse profile characteristics include shape, duration and peak amplitude of an anticipated shock pulse associated with shock events for a particular application.

4. An adaptive energy absorption system of claim 1, wherein the predetermined acceleration pulse profile characteristics include shape and peak amplitude of an anticipated shock pulse associated with shock events for a particular application.

5. An adaptive energy absorption system of claim 1, wherein the variable profile energy absorber is a linear magnetorheological fluid damper.

6. An adaptive energy absorption system of claim 1, wherein the variable profile energy absorber is a rotary magnetorheological fluid brake or clutch.

7. An adaptive energy absorption system of claim 1, wherein the variable profile energy absorber is an electronically adjustable friction device selected from the group consisting of a piezo friction damper and magnetically controlled friction damper.

8. An adaptive energy absorption system of claim 1, wherein the variable profile energy absorber is an electronically adjustable hydraulic damper with an orifice adjusted by electromechanical actuator.

9. An adaptive energy absorption system of claim 1, further comprising a predetermined shock acceleration profile stored in said controller memory.

10. An adaptive energy absorption system of claim 9, further comprising a library of different predetermined shock acceleration profiles stored in said controller memory.

11. An adaptive energy absorption system of claim 10, wherein said controller selects one predetermined shock acceleration profile from said library based on a position of a manual switch.

12. An adaptive energy absorption system of claim 10, wherein said controller selects one predetermined shock acceleration profile from said library based on a measurement from said one or more sensors.

13. An adaptive energy absorption system of claim 1, further comprising a payload mass/weight sensor.

14. An adaptive energy absorption system of claim 13, wherein the payload mass/weight sensor is a force transducer.

15. An adaptive energy absorption system of claim 13, wherein the payload mass/weight sensor is a strain gauge.

16. An adaptive energy absorption system of claim 13, wherein the payload mass/weight sensor is a pressure sensor.

17. An adaptive energy absorption system of claim 13, wherein a mass value is periodically measured by said payload mass/weight sensor to update a stored payload mass value in the controller.

18. An adaptive energy absorption system of claim 13, wherein the payload mass/weight is continuously monitored at said payload mass/weight sensor by said controller.

19. An adaptive energy absorption system of claim 18, wherein the monitored payload mass/weight is filtered to remove undesirable oscillations.

20. An adaptive energy absorption system of claim 1, further comprising
  a. a spring;
  b. a sensor for measuring relative displacement of the payload with respect to a supporting structure.

21. An adaptive energy absorption system of claim 20, wherein the payload mass is derived from a displacement signal and known spring stiffness.

22. An adaptive energy absorption system of claim 20, wherein the payload mass is derived from relative static displacement of the spring due to gravitational acceleration.

23. An adaptive energy absorption system of claim 22, wherein the relative static displacement is derived by filtering a real-time displacement signal from said sensor for measuring relative displacement of the payload with respect to the supporting structure to remove undesirable oscillations in said real-time displacement signal.

24. An adaptive energy absorption system of claim 20, wherein the controller determines that a free-fall is occurring by a displacement sensor measurement and multiplies an expected constant free-fall acceleration by the amount of time in free-fall to determine impact velocity.

25. An adaptive energy absorption system of claim 20, wherein a free fall event is determined by the controller comparing a real-time measured displacement with a known static displacement value.

26. An adaptive energy absorption system of claim 1, wherein the known payload mass/weight is predetermined and stored in said controller memory.

27. An adaptive energy absorption system of claim 1, wherein at least one of said one or more sensors for determining impact velocity comprises an existing vehicle instrumentation component from among the group consisting of a tachometer, speedometer, altimeter, and air speed indicator.

28. An adaptive energy absorption system of claim 27, wherein the controller multiplies expected constant free-fall acceleration by the amount of time in free-fall to determine impact velocity.

29. An adaptive energy absorption system of claim 1, wherein one or more of said sensors are mounted to the payload for determining impact velocity.

30. An adaptive energy absorption system of claim 29, wherein one or more of said payload mounted sensors are accelerometers.

31. An adaptive energy absorption system of claim 30, wherein the controller determines that a free-fall is occurring by a displacement sensor measurement and integrates an accelerometer measurement with respect to time to determine impact velocity.

32. An adaptive energy absorption system of claim 31, wherein the controller periodically resets the integration to remove drift due to noise and or bias.

33. An adaptive energy absorption system of claim 31, wherein the controller interrupts periodic resetting of said integration during a free fall event.

34. An adaptive energy absorption system of claim 31, wherein the controller interrupts periodic resetting of the integrator when a logical threshold from among displacement, velocity, and/or acceleration thresholds are exceeded.

35. An adaptive energy absorption system of claim 30, wherein a free fall event is determined by the controller evaluating accelerometer measurements.

36. An adaptive energy absorption system of claim 27, wherein the controller determines that a free-fall event is occurring by integrating a measurements of said accelerometers with respect to time to determine impact velocity.

37. An adaptive energy absorption system of claim 1, wherein the controller pre-adjusts the variable profile energy absorber to an appropriate value prior to an impact based upon known mass value, real-time impact velocity determination, and knowledge of the predetermined acceleration pulse profile characteristics of said impact.

38. An adaptive energy absorption system of claim 1, wherein the controller adjusts the variable profile energy absorber in real-time to a value that is proportional to a mathematical function of payload mass/weight and the real-time payload velocity measurement.

39. An adaptive energy absorption system of claim 38, wherein the controller adjusts the variable profile energy absorber in real-time to a value that is proportional to payload mass/weight and an nth order polynomial function of the real-time payload velocity measurement.

40. A method of controlling a variable profile energy absorber with a controller to minimize acceleration of a payload during a shock event, said controller comprising a microprocessor operatively connected to memory in which is stored a predetermined shock acceleration profile library, the method comprising the steps of:

inputting a mass of said payload and communicating said mass to said microprocessor;

measuring velocity of said payload prior to a shock event and communicating said velocity to said microprocessor;

selecting from said memory a predetermined shock acceleration profile by said microprocessor;

calculating by said microprocessor a priori expected shock impulse levels during said shock event based on said inputted mass, monitored velocity, and selected predetermined shock acceleration profile;

calculating by said microprocessor a required oppositional force to be applied said payload to mitigate said expected shock impulse levels during said shock event;

signaling a variable profile energy absorber to apply said calculated required oppositional force to said payload.

41. A method of controlling a variable profile energy absorber with a controller to mitigate acceleration of a payload during a shock event, said controller comprising a microprocessor operatively connected to memory in which is stored a predetermined shock acceleration profile library, the method comprising the steps of:

weighing said payload by a weight sensor to determine a weight and communicating said determined payload weight to said microprocessor;

monitoring impact velocity of said payload prior to a shock event and communicating said velocity to said microprocessor;

selecting from said memory a predetermined shock acceleration profile by said microprocessor;

calculating by said microprocessor a priori expected shock impulse levels during said shock event based on said payload weight, monitored velocity, and selected predetermined shock acceleration profile;

calculating by said microprocessor a required oppositional force to be applied to said payload to mitigate said expected shock impulse levels during said shock event;

signaling a variable profile energy absorber to apply said calculated required oppositional force to said payload.

* * * * *